May 6, 1941. W. L. GROENE 2,240,949
CRANKSHAFT CHUCK
Filed Dec. 22, 1939 2 Sheets-Sheet 1
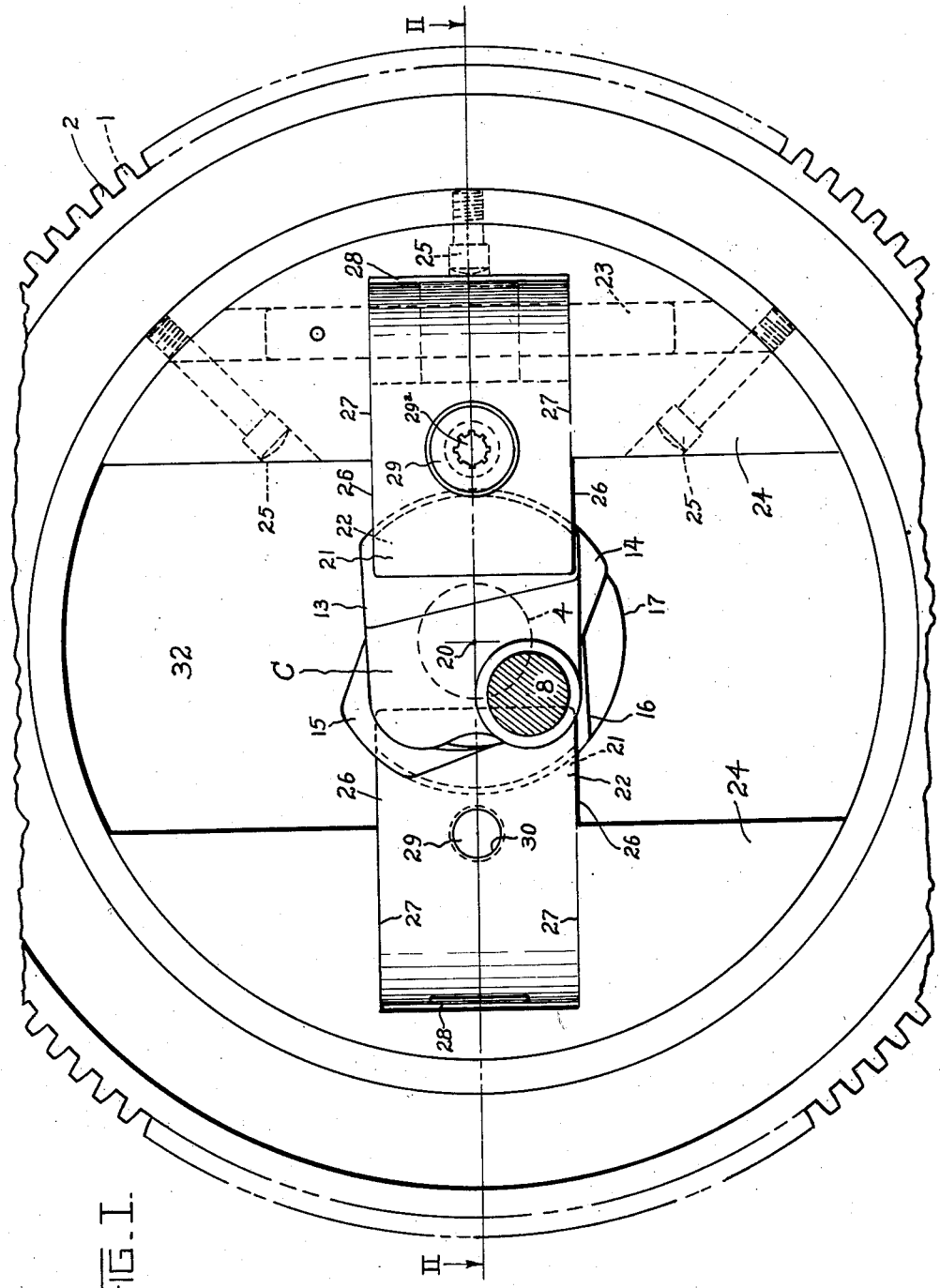
FIG. I.
INVENTOR.
Willard L. Groene May 6, 1941.  W. L. GROENE  2,240,949
CRANKSHAFT CHUCK
Filed Dec. 22, 1939   2 Sheets-Sheet 2
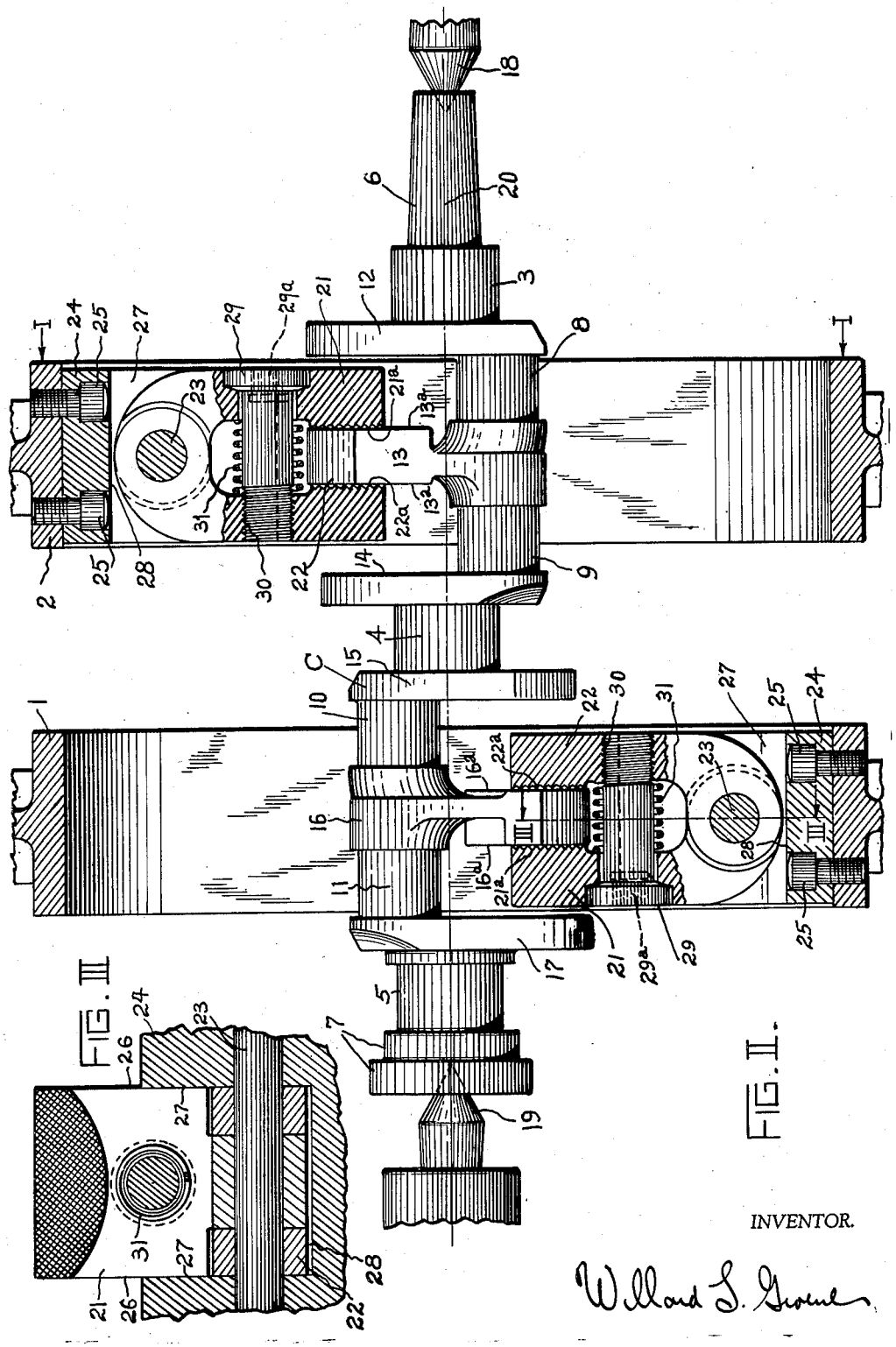
INVENTOR.
Willard L. Groene Patented May 6, 1941

2,240,949

UNITED STATES PATENT OFFICE 2,240,949

CRANKSHAFT CHUCK

Willard L. Groene, Cincinnati, Ohio, assignor to The R. K. Le Blond Machine Tool Company, Cincinnati, Ohio, a corporation of Delaware Application December 22, 1939, Serial No. 310,589

16 Claims. (Cl. 82—40)

This invention pertains to chucking mechanism for use in connection with gripping prelocated, rough irregular work pieces in a lathe. More particularly this invention pertains to the chucking of crankshafts, having rough, irregular webs and prelocated in a lathe for purposes of machining bearing portions of the crankshaft. Specifically, this invention is applicable to the center drive type of lathe for machining all of the line bearings, flange, and stub ends of crankshafts, for example, as shown in Patent 2,069,107, dated January 26, 1937.

Heretofore all chucking devices used for accomplishing the accurate chucking of a prelocated work piece having rough irregular surfaces, such as the rough irregular webs of a crankshaft, have all been impractical and lacking in accurate results. The chief defects which have been characteristic and inherent in such former chucking devices have been:

(a) To utilize the prelocated work piece to initially locate and position the work engaging portion of the chucking device during initial engagement of the chucking device with the work piece.

(b) Utilization of clamping action which brought the chuck device into engagement with the work piece in a direction perpendicular to the axis of rotation of the work piece in the lathe.

In the first instance difficulty rises since the work piece must be extremely rigid to withstand the strain imposed upon it during the initial engagement of the chucking device therewith and during the time this chucking member is being bound on to the work piece. This method of gripping the rough irregular work piece, such as a crankshaft, is found wholly impractical because the crankshaft is of such a limber nature that any such engagement of a chucking member on the web of the crankshaft during the initial clamping invariably distorts the crankshaft from its true accurate position on the axis of the lathe. It is to be remembered that the objective in a lathe of this kind is to chuck the crankshaft so accurately that the runout will be one thousandth of an inch or less in order that subsequent finish grinding may be undertaken directly upon the bearings which have been turned in such a lathe, and so that the runout of these bearings will be so accurate as to prevent any possibility of lack of finishing up these bearings during these finish grinding operations. Runout, as commonly used in the turning art, means the relative eccentricity of the bearings from their true axis of rotation. Such type chucks which operate with the defective principle above may be classified as chucks of a type which have a work engaging member which is first clamped up on the work piece and then this work engaging member is later locked frictionally to the work spindle of the lathe upon which it is mounted, such chucks for example being of a type shown in Patent 1,617,403, dated February 15, 1927.

The second type of chucking device which is automatically compensating, but which has clamping action in a direction perpendicular to the axis of rotation of the work piece in the lathe, is defective because such direction of clamping action during the final tightening stages tends to move the crankshaft from true prelocated position on the axis of the lathe so that the crankshaft will be chucked inaccurately and after the completion of the machining operation will spring back to cause the crankshaft to have excessive runout of the bearing portions machined when again unchucked after the turning operation. Such type chucks, for example, may be illustrated by Patent 2,160,967, dated June 6, 1939, in which the work engaging members are finally engaged on the work piece by radial movement toward the axis of rotation of the work piece to be machined.

It is therefore, the primary object of this invention to completely avoid either of these principles of former rough work engaging chucking devices and to completely depart from the old ideas used therein and to provide a chucking device which is fully equalizing longitudinally or lengthwise of the axis of rotation of the work to be turned but which has no relative movement on the work spindle in any radial or circumferential direction in a plane perpendicular to said axis of rotation.

Another important and distinct feature of this new invention is to provide a chucking device for engaging a rough irregular prelocated work piece in a lathe which engages the work in such a way that the clamping action of the chucking device on the work pieces takes place in a line substantially parallel with the axis of rotation of the work piece in the lathe so that no matter how tightly said clamping device is bound upon the work piece it can have no effect whatever on the axial or radial displacement of the work piece from its true prelocated position on the work spindle axis of the lathe.

A further object is to provide a chucking device which is adapted to engage a rough irregular work piece without distorting or bending it from its true axial position by effecting clamping action in a direction parallel with the axis of rotation of the work piece in the chuck while at the same time allowing free axial floating of the work piece longitudinally of said axis for endwise position of the crankshaft by means independent of the chucking device.

And a still further feature of this invention is to provide in a center drive lathe a pair of chucking devices each adapted to engage a rough, prelocated work piece by means movable in a direction substantially parallel to the axis of rotation of the lathe, one of said chucking devices being located diametrically opposite the other chucking device relative to said axis of rotation.

Further features and advantages of this invention will appear in the following detailed description of the drawings in which:

Fig. I is an axial view of a pair of center drive ring gears of a double center drive crankshaft lathe, incorporating the novel chucking mechanism of this invention on the line I—I of Figure II.

Fig. II is a transverse section, on the line II—II of Fig. I, through the pair of double center drive ring gears illustrated in Fig. I, showing the method of engaging the chucking members on the rough irregular prelocated work crankshaft in such a double center drive lathe.

Fig. III is an enlarged detailed view of one of the chucking jaws in one of the ring gears shown on the line III—III of Fig. II.

For illustrative purposes this invention is shown applied to the ring gears 1 and 2 of a double center drive line bearing crankshaft lathe of a type, for example, as illustrated in Patent 2,069,107 cited above, in which a crankshaft C, having line bearings 3, 4 and 5, the stub end 6 and flange end 7, the pin bearings 8, 9, 10, 11, and interconnecting webs 12, 13, 14, 15, 16 and 17 is mounted on the usual lathe centers 18 and 19. In this type of lathe the cutting tools (not shown) are adapted to machine the line bearings 3, 4, 5 and the stub end 6 and flange end 7 of the crankshaft in a single operation. Having thus placed the work crankshaft C on the centers 18 and 19, its axis of rotation 20 will then properly coincide with the axis of rotation of the ring gears 1 and 2 of the lathe. The problem then is to properly grip this crankshaft intermediate these centers 18 and 19 so as to very rigidly and positively hold the crankshaft against any distortion which may come upon it during the application of the cutting tools to the various line bearing portions but which also is capable of gripping the shaft initially with this rigid positive action without in any way moving the crankshaft or bending it out of proper axial alignment with the axis of rotation 20 of the lathe. In order to do this the object of this invention is to avoid the usual application of a gripping member to the rough periphery of the webs of the crankshaft and then locking this gripping member to the ring gears so to apply any chucking members to the periphery of these webs of the shaft with clamping force exerted in a plane perpendicular to this axis 20. Rather it is the object of this invention to apply gripping jaws 21 and 22 which engage the sides 21a and 22a of the respective webs 13 and 16 of the crankshaft in a direction parallel with the axis of rotation 20 of the lathe.

In this particular illustration a pair of center drive ring gears 1 and 2 are shown but insofar as the detail constructions of the chucking mechanism in each of the ring gears is concerned they are substantially the same in both ring gears so that the discussion of the mechanism in one of said ring gears will suffice for that of the other ring gear.

Noting particularly Fig. II, each of the work engaging jaws 21 and 22 are pivotally mounted on a hinge pin 23 which is securely fixed in the segmental member 24, fixed into the ring gears 1 and 2 by appropriate screws 25. This pivotal hinge mounting of these jaws 21 and 22 is so arranged that the serrated end portions 21a and 22a move substantially parallel to the axis 20 of the lathe to engage the rough web surfaces 13a and 16a of the crankshaft C.

In order to prevent movement of these gripping jaws 21 and 22 other than axial swinging movement parallel with the axis 20 of the crankshaft, the edges 26 of each of the jaws nicely fit between the sides 27 of the slots 28 formed in the segmental piece 24 so that they can have no relative movement with respect to the chuck body in a plane perpendicular to the axis 20 of the chuck, the hinge pin 23 preventing all radial movement of said jaws with respect to the ring gears.

It is thus apparent that with this unique arrangement the roughness or irregularities of the webs 13 and 16 can have no effect on the position of the jaws 21 and 22 in a plane perpendicular to the axis 20 of the lathe, so that the difficulties in former devices of attempting to accurately radially position the work engaging jaws in this perpendicular plane by engagement with the rough web surface is completely avoided. The positioning of these jaws longitudinally of the axis 20 is of no consequence and in no way effects the radially positioning of the crankshaft in proper alignment with the axis 20. These jaws are purposely made floating in this respect to prevent binding of the crankshaft axially between the ring gears 1 and 2 and to permit the centers 18 and 19 to be properly adjusted for axially or endwise positioning of the crankshaft in the lathe relative to the cutting tools.

In order to securely bind these jaws 21 and 22 upon the webs 13 and 16 of the crankshaft, the clamping screw 29 is provided having a suitable wrench socket 29a provided in its head and which may be operated by means of a hand wrench or by means of a power chucking device of the type shown in application, Serial No. 298,230 dated October 6, 1939. This clamping screw 29 is suitable threaded at 30 in one of the jaws so that as the screw is properly rotated these jaws may be postively brought together to literally pinch the web 13 or 16 between the serrated ends 21a and 22a of the respective chuck jaws. A relatively light compression spring 31 is provided around the screw 29 and between the two gripping jaws 21 and 22 to normally urge them outwardly, disengaging their serrated portions from the web when the clamping screw 29 is loosened, so that these webs will be properly freed from contact with clamping jaws for loading or unloading the crankshaft into the lathe.

The operation of such a double center drive with this novel arrangement is substantially as follows:

The crankshaft is first entered axially in to the center drive ring gears by means of a loading device preferably of a character shown in Patent 1,700,721 dated January 29, 1929, by moving it axialy through the space indicated until it has been properly axially positioned along the axis 20 in the ring gears. The loading device is then operated to lower the crankshaft radially of the axis 20, bringing the webs 13 and 16 downwardly between the respective chuck jaws 21 and 22 of each ring gear. The centers 18 and 19 are then moved inwardly to engage and pick up the crankshaft so that the loading crane device may then be removed from the lathe in a manner fully described in the cited Patent 1,700,721. Having thus prelocated the workshaft C in the lathe on the axis 20, the clamping screws 29 are then appropriately tightened to bind the jaws 21 and 22 on these webs 13 and 16 of the crankshaft C. The crankshaft is now properly gripped ready for the completion of the cutting operations in this instance, on all of the line bearing portions, the stub, and flange ends of the crankshaft. At the completion of these turning operations the clamping screws 29 are released, the springs 31 removing the jaws from engagement with the web 13 and 16 and the loading device then is moved inwardly to engage the work crankshaft C. Centers 18 and 19 are then withdrawn and the work raised radially upwardly and then moved axially outwardly through the space 32 in the ring gears completing the unloading and the machining cycle of the lathe.

Having thus fully set forth and described my invention what I claim is:

1. In a lathe, a pair of centers adapted to engage and prelocate a work piece on the axis of rotation of said lathe, a rotatable work spindle, work engaging members on said work spindle arranged to engage said prelocated work piece in a direction substantially parallel to said axis of rotation of said lathe, and means preventing movement of said members perpendicular to said axis of rotation.

2. In a lathe, a pair of centers adapted to engage and prelocate a work piece on the axis of rotation of said lathe, a center drive ring gear intermediate said centers, chucking mechanism in said ring gear adapted to engage by engagement said work piece in a direction substantially parallel to said axis of rotation, and means preventing movement of said members perpendicular to said axis of rotation.

3. In a lathe, a pair of centers, a pair of center drive ring gears intermediate said centers, work engaging chucking mechanism in each of said ring gears, means for effecting clamping of said chucking mechanism on a work piece prelocated on said centers by movement of said work engaging members in a direction substantially parallel to said axis of rotation of said lathe, and means preventing movement of said members perpendicular to said axis of rotation.

4. In a lathe, a pair of centers, a pair of center drive ring gears intermediate said centers, work engaging members in each of said ring gears, the work engaging members of said ring gears being located on diametrically opposite sides of said axis of rotation, means for actuating said members to engage said work piece in a direction substantially parallel to the axis of rotation of said lathe, and means preventing movement of said members perpendicular to said axis of rotation.

5. In a lathe, a pair of centers, a center drive ring gear between said centers, chucking mechanism in said ring gear comprising a pair of opposed rough work engaging jaws mounted in said ring gears for movement substantially parallel to the axis of rotation of said lathe, means for effecting clamping of said pair of work engaging members on a rough prelocated work piece on the centers of said lathe and means preventing radial movement of said jaws relative to said axis of rotation.

6. In a lathe, a pair of centers adapted to prelocate a work piece on the axis of rotation of said lathe, a pair of center drive ring gears intermediate said centers, chucking mechanism in each of said ring gears each comprising a pair of work engaging members and means for moving said work engaging members in a direction substantially parallel to the axis of rotation of said lathe to clamp said work engaging members on said rough prelocated work piece on the axis of rotation of said lathe, and means preventing movement of said members radially of said axis.

7. In a lathe, a rotatable work spindle, a pair of work engaging jaws pivotally mounted on said work spindle having serrated work engaging surfaces for engaging a rough prelocated work piece in a lathe, a clamping screw passing through one of said jaws and threaded into the other of said jaws, resilient means for urging said jaws away from each other, and means for rotating said screw to effect clamping action of said jaws on said work piece in a direction substantially parallel to the axis of rotation of said lathe.

8. In a lathe, a rotatable work spindle, a pair of work engaging jaws pivotally mounted on said work spindle against any radial or circumferential movement on said work spindle, means for drawing said jaws together to effect clamping of said jaws on a work piece in said lathe in a direction substantially parallel to the axis of rotation of said lathe, and means permitting axial float of said work piece and said clamping devices relative to said work spindle.

9. In a lathe, a pair of centers for engaging the ends of a work piece to prelocate it on the proper axis of rotation in said lathe and to axially position said work piece longitudinally of said axis, a rotary work spindle mounted in said lathe, chucking mechanism on said spindle having work engaging members adapted to engage said work piece by movement in a direction substantially parallel to the axis of rotation of said lathe, and means on said spindle to prevent movement of said members perpendicular to said direction of engaging movement.

10. In a crankshaft lathe, a pair of centers adapted to engage the ends of a crankshaft to be machined to position said crankshaft on the axis of rotation of said lathe, a center drive ring gear rotatably mounted in said lathe, rough work engaging members in said chuck adapted to engage the sides of a web of said crank shaft, means for binding said clamping mechanism to the sides of said web by movement of said gripping members in a direction substantially parallel to the axis of rotation of said work piece in the lathe, and means to prevent movement of said members in any other direction.

11. In a double center drive crankshaft lathe, a pair of centers adapted to engage the ends of a rough crankshaft to be machined in said lathe, a pair of rotatable ring gears journaled in said frame, chucking mechanism in each of said ring gears comprising members adapted to engage the sides of webs of said crankshaft, means for effecting clamping of said members to said webs by movement in a direction substantially parallel to the axis of rotation of said lathe, and means in said ring gear preventing radial movement of said members relative to said axis.

12. In a double center drive crankshaft lathe, a pair of centers, a pair of center drive ring gears mounted in said lathe intermediate said centers, chucking mechanism in each of said ring gears comprising a pair of clamping jaws adapted to engage the sides of webs of said crankshaft, clamping means associated with said clamping jaws to bind said jaws to said web by movement of said jaws in a direction substantially parallel to the axis of rotation of said lathe, and means in said ring gears preventing radial movement of said jaws relative to said axis.

13. In a double center drive crankshaft lathe, a pair of centers adapted to prelocate a crankshaft on the proper axis of rotation in said lathe, a pair of double center drive ring gears, chucking mechanism in each of said ring gears each comprising members adapted to engage the sides of webs of said crankshaft, means for clamping said jaws to said webs by movement substantially parallel to the axis of rotation of said lathe, said chucking mechanism in one of said chucking devices being located substantially diametrically opposite the chucking mechanism in the other of said ring gears with respect to said axis of rotation of said ring gears, and means in said ring gears preventing radial movement of said jaws relative to said axis.

14. In a double center drive crankshaft lathe, a pair of centers, adapted to engage the ends of a rough crankshaft to be machined and to prelocate said crankshaft on the proper axis of rotation of said lathe and to axially position said crankshaft longitudinally of said axis, a pair of rotatable center drive ring gears in said lathe, chucking mechanism comprising work engaging members in each of said ring gears floatingly mounted for movement substantially parallel to the axis of rotation of said lathe, means for effecting clamping of said work engaging members of said chucking mechanism on the sides of webs of said crankshaft, said means effecting movement in said members substantially parallel to the axis of rotation of said lathe, and means in each of said ring gears preventing any movement of said members in a plane perpendicular to said axis of rotation of said ring gears of said lathe.

15. In a chucking device for lathes, a rotatable work spindle, a pair of chucking jaws mounted for axial floating movement parallel with the axis of rotation of said work spindle, means for effecting clamping action of said chucking members on a work piece located on the axis of rotation of said lathe in a direction substantially parallel to said axis so as to rigidly hold said work piece against displacement radially of said axis, and means independent of said chucking mechanism for axially positioning a work piece in said lathe lengthwise of said axis of rotation.

16. In a lathe, a rotatable work spindle, chucking mechanism on said work spindle comprising work engaging members adapted to move into engagement with a work piece on said work spindle in a direction substantially parallel to the axis of rotation of said work spindle, means permitting axial floating movement in said chucking members, means preventing all movement of said chucking members in a plane perpendicular to said axis of rotation, and means associated with said clamping member for effecting binding of said clamping members on said work piece.

WILLARD L. GROENE.